United States Patent [19]

Anno et al.

[11] Patent Number: 4,996,126
[45] Date of Patent: Feb. 26, 1991

[54] DEVELOPER HAVING SPECIFIC SPHERIODICITY

[75] Inventors: Masahiro Anno; Eiichi Sano, both of Osaka, Japan

[73] Assignee: Minolta Camera Kabushiki Kaisha, Osaka, Japan

[21] Appl. No.: 299,551

[22] Filed: Jan. 18, 1989

[30] Foreign Application Priority Data

Jan. 20, 1988 [JP] Japan .................................. 63-10246

[51] Int. Cl.$^5$ ...................... G03G 9/093; G03G 9/107
[52] U.S. Cl. .................................. 430/106.6; 430/108; 430/109; 430/110; 430/111; 430/138
[58] Field of Search ............... 430/108, 109, 111, 138, 430/106.6

[56] References Cited

U.S. PATENT DOCUMENTS

| | | | |
|---|---|---|---|
| 3,914,181 | 10/1975 | Berg et al. | 430/108 |
| 4,284,701 | 8/1981 | Abbott et al. | 430/111 |
| 4,557,992 | 12/1985 | Haneda et al. | 430/120 |
| 4,592,988 | 6/1986 | Aldrich et al. | 430/108 |
| 4,600,675 | 7/1986 | Iwasa et al. | 430/106.6 |
| 4,601,967 | 7/1986 | Suzuki et al. | 430/107 |
| 4,614,698 | 9/1986 | Miyakawa et al. | 430/111 |
| 4,746,589 | 5/1988 | Haneda et al. | 430/98 |
| 4,822,711 | 4/1989 | Itaya et al. | 430/120 |
| 4,825,246 | 4/1989 | Fukuchi et al. | 430/357 |

FOREIGN PATENT DOCUMENTS

| | | | |
|---|---|---|---|
| 0004748 | 3/1979 | European Pat. Off. | |
| 59-218459 | 12/1984 | Japan | 430/111 |
| 59-218460 | 12/1984 | Japan | 430/111 |
| 60-10258 | 1/1985 | Japan | 430/111 |
| 61-275766 | 8/1986 | Japan | |
| 61-275767 | 8/1986 | Japan | |
| 1174571 | 12/1969 | United Kingdom | 430/111 |

*Primary Examiner*—Roland Martin
*Attorney, Agent, or Firm*—Burns, Doane, Swecker & Mathis

[57] ABSTRACT

This invention relates to a two-components developer containing toners and carriers wherein the toners have spheroidicity of 150 or less, mean particle size of 14 μm or less and coefficient of variation of 15% or less, and the carriers have mean particle size of between 20 μm and 70 μm and/or spheroidicity of 140 or more.

19 Claims, No Drawings

DEVELOPER HAVING SPECIFIC SPHERIODICITY

BACKGROUND OF THE INVENTION

This invention relates to a developer for electrostatic latent images in electrophotography, electrostatic record or electrostatic printing, more particularly, to a developer that can duplicate images finely, in high quality, and without toner scattering.

As a copying machine for electrophotography has become popular to be used generally, copied images are required to have higher quality and finer reproducibility, mesh pattern reproducibility or half-tone reproducibility than before. It is necessary to use toners with as small size and as sharp distribution as possible in order to meet the requirements. The sharp distribution of particle sizes improves line reproducibility, mesh pattern reproducibility or half-tone reproducibility and the like, and further effects sharp charge-distribution to result in the improvement of image quality such as texture and the like. Techniques that specify the distribution of particle sizes are known in the disclosures of, for example, Japanese patent application of published No. 24369/1982 and Japanese patent application of laid open Nos. 106554/1983, 275766/1986 or 275767/1986 etc.

However, to make particle sizes of toners small results in the decrease of fluidity of toners itself or developers. Therefore, it is desirable to make toners spherical as well as to make particle sizes of toners small in order to prevent the decrease of fluidity of toners or developers.

When toners are made spherical, there arise other problems such as low contact-possibility and low chargeability because of the spherical shapes. That is, the use of ferrite type carriers which are used generally for toners of small sizes or spherical toners results in the formation of copied images with many fogs on account of poor electrification-build-up, broadening of charge distribution and flying of many toners and the like.

SUMMARY OF THE INVENTION

The object of the invention is to provide a developer containing small and spherical toners with narrow distribution of particle sizes, which is excellent in fluidity, electrification-build-up, prevention of toner scattering and prevention of fogs.

The object is achieved by a two components developer containing toners and carriers wherein the toners have spheroidicity of 150 or less, mean particle size of 14 $\mu$m or less and coefficient of variation of 15% or less, and the carriers have mean particle size of between 20 $\mu$m and 70 $\mu$m and/or spheroidicity of 140 or more.

DETAILED DESCRIPTION OF THE INVENTION

The present invention provides a developer excellent in fluidity, electrification-build-up, charge stability, prevention of toner scattering and formation of copied images of high quality without fogs even if small and spherical toners with narrow distribution of particle sizes are used.

The present invention has accomplished the above object by the combination of specified toners and specified carriers in sizes and shapes.

A developer of the present invention comprises toners and carriers wherein toners have spheroidicity of 150 or less, mean particle size of 14 $\mu$m or less and coefficient of variation of 15% or less, and the carriers have mean particle size of between 20 $\mu$m and 70 $\mu$m and/or spheroidicity of at least 140.

From the view point of the formation of high quality copied images, it is preferable that the particle size of a toner to be smaller as well as the distribution of particle sizes of toner to be narrower.

However, the use of spherical toners having small particle sizes of 14 $\mu$m or less, particularly 2 $\mu$m–10 $\mu$m in mean particle size, 15% or less, particularly 10% or less in coefficient of variation and 150 or less, particularly 140 or less in spheroidicity together with generally used carriers which do not have specified size and shape causes the problems such as toner scattering, toner-chargeability and the like. In practice, the combination of the above toners with the carriers does not effect the formation high quality copied images, resulting in the generation of fogs and the like.

Fluidity is in general one of important properties of toners. However, the fluidity is much important for toners of small particle sizes, because the size is one of elements to achieve the formation of high quality copied images as shown in the invention. In general, the bigger, the size of toner is, or the sharper, the distribution of particle size is, or the more spherical, the shape of toner is, the better, the fluidity is. From the view point of copied image quality, it is necessary to make particle size small up to 14 $\mu$m or less, preferably 2–14 $\mu$m, more preferably 2–10 $\mu$m in mean particle size. The particle size required for fluidity conflicts with that required for image quality. However, although toners are small in particle size, mixing and stirring properties are maintained in practical use and good image quality can be achieved in the combination of toners having both spheroidicity (SF1) of 150 or less and coefficient of variation of 15% or less with a carrier having specified size and shape as described below.

In particular, the toners for use in the present invention which are small in mean particle size and narrow in particle size distribution are accompanied with problems such as electrification-build-up and toner scattering. However those problems can be solved by use of carriers of 20–70 $\mu$m in mean particle size and/or 140 or more in spheroidicity.

Carriers with the specified size and/or the specified shape as above mentioned can mix, stir and charge uniformly and quickly spherical toners of small sizes and narrow particle size distribution, resulting in effective electrification-build-up and prevention of toner flying, and can provide high quality copied images without fogs and the like, taking advantages of the benefits of toners of small particle sizes and narrow particle size distribution.

The particle sizes of carriers particularly effect electrification-build-up, stability and prevention of toner flying. Carriers out of the range of 20–70 $\mu$m in mean particle size can not achieve the foregoing effects sufficiently.

The spheroidicity of carriers also effects electrification-build-up, stability and prevention of toner flying. Carriers with spheroidicity of less than 140 can not achieve the foregoing effects sufficiently.

Most preferably carriers in the present invention have 20–70 $\mu$m in mean particle size and 140 or more in spheroidicity.

Spheroidicity is one of shape coefficients which specify shapes of particles, abbreviated to "SF1". SF1 is defined as;

$$SF1 = \frac{(\text{maximum length})^2}{(\text{area})} \times \frac{(\pi)}{4} \times 100$$

Wherein "area" means the projected area of a particle and "maximum length" means the longest length in the projected image of a particle.

SF1 is used as a parameter which shows the difference between the long diameter and short diameter of a particle (distortability), shows the external surface area of a particle and the degree of roughness of a particle surface. The value of SF1 becomes near to the value of 100 as the shape is closer to a circle.

Spheroidicity in the invention is expressed by the mean value measured with Image Analyzer (LUZEX 5000, made by Nihon Regulator K.K.), but, the value is limited to the one measured by the above Image Analyzer, because the value does not depend generally on a kind of measuring apparatus.

Coefficient of variation in the present invention means variation measures (%) obtained as follows; a photograph is taken with a scanning electron microscope, one hundred of particles are taken at random for measurement of particle sizes to obtain a standard deviation value ($\sigma$), the standard deviation value ($\sigma$) is divided by the mean particle size (x), and one hundred times the divided value is the coefficient of variation (%).

The standard deviation value is represented by the square root of the total values of the square of the difference between the mean particle size and each particle size represented by the following formula;

$$\sigma = \sqrt{\frac{(x_1 - x)^2 + (x_2 - x)^2 + \ldots (x_n - x)^2}{n - 1}}$$

$$= \sqrt{\frac{1}{n-1}\left[\Sigma x_i^2 - \frac{(\Sigma x_i)^2}{n}\right]}$$

Wherein $x_1$, $x_2$ ---, $x_n$ represent respective particle sizes of sample particles, x represents the mean value of the n particle sizes.

The mean value of toners in the present invention is shown by a value obtained by measuring relative weight distribution of each particle size with Coulter Counter II (made by Coulter Counter Inc.,) equipped with aperture tube of 100 μm.

The mean value of carriers is shown by a value measured with Micro Truck Model 7995-10SRA (made by Nikkiso K.K.).

As above mentioned, the specified size and shape etc. of carriers are significant elements in order to form high quality copied images without toner scattering, fogs and the like by using spherical toners which are narrow in particle size distribution and small in particle size Further, the aggregation properties of developers, spent phenomena of carriers, the density of images and carrier lines and the like have been found to be related to solid state properties such as the magnetic force of carriers and the specific gravity of carriers.

That is, the magnetic force of carriers needs 900–3000 gauss, preferably 1800–2800 gauss in the magnetic field of 1000 Oe.

If the magnetic force is smaller than 900 gauss in the magnetic field of 1000 Oe, carriers come to be developed, and copied images become deteriorated. If the magnetic force is bigger than 3000 gauss, ears of magnetic brushes become hard, resulting in the generation of carrier lines in solid parts etc.

The preferred specific gravity of carriers is 5 or less from the view point of the improvement of mixing and stirring properties and aggregation properties as developers. If the specific gravity of carriers is bigger than 5, the large difference of specific gravity between toners and carriers deteriorates mixing and stirring properties, the excessive stress to toners causes spent carriers resulting in the deterioration of the charging stability, and toners and/or carriers become liable to aggregate.

Toners for use in the present invention may be prepared by a known method such as a suspension-polymerizing method, a encapsulizing method, a spray-drying method and the like so far as the toners may be applied to a developing system of two-components. Carriers for use in the present invention are not limited to specified ones by kinds of carriers and its production method etc., but exemplified by ferrite, coated iron particles, coated ferrite, granulated iron particles, binder-type carriers, surface-modified carriers.

Carriers and toners with specified sizes and shapes are mixed at the content of 1–20 wt% of toners for the preparation of a developer the present invention.

Production Methods of toners

Production examples of Toners a–c

One hundred parts by weight of spherical monodisperse copolymer of styrene with n-buthyl methacrylate (8 μm in mean particle size: 54 °C. in glass transition temperature: 128 °C. in softening temperature) prepared by seed polymerization, 8 parts by weight of carbon black (MA#8; made by Mitsubishi Kasei Kogyo K.K.) were set in Henshel Mixer with capacity of 10 liters, mixed and stirred for 2 minutes at the rotation speed of 1500 rpm, so that carbon black might be adhered to the surfaces of polymer particles. And then, the resultant particles with carbon black particles were treated at 7000 rpm for 3 minutes with the use of Hybridization System NHS-1 (made by Nara Kikai Seisakusho K.K.), so that the carbon black particles might be fixed to the surfaces of the copolymer particles.

Then, 100 parts by weight of the resultant polymer particles treated with carbon black and 10 parts by weight of PMMA particles MP-1451 (0.15 μm in mean particle size; 125 °C. in glass transition temperature: made by Soken Kagaku K.K.) were mixed and stirred in a same manner as that of the above process, so that the surfaces of the polymer particles were coated with the PMMA resin. Furthermore, 100 parts by weight of the obtained PMMA-coated polymer particles, and 0.5 parts by weight of Spilon Black TRH of chromium-type dye (made by Hodoya Kagaku Kogyo K.K.) as a negative charge-controlling agent were mixed and stirred in the same manner as that of the above process, so that the particles of Spilon Black might be fixed to the surfaces of the polymer particles, to obtain Toner a of 8.3 μm in mean particle size, 132 in spheroidicity and 8% of coefficient of variation.

Toners b and c were prepared in a similar manner to the preparation of Toner a except that materials shown in the following Table 1 were used for toner productions.

TABLE 1

| toner sample | seed polymerization particle size (μm) | carbon black | polymer fine particles for the formation of coating layer | charge controlling agent | mean particle size of toner | spheroidicity SF1 | efficient of variation |
|---|---|---|---|---|---|---|---|
| a | 8 | MA#8 | MP-1451 | Spilon Black | 8.3 | 132 | 8 |
| b | 3 | 8 parts by weight made by Mitsubishi Kasei Kogyo K.K. | 10 parts by weight made by Soken Kogaku K.K. | TRH 0.5 parts by weight made by Hodoya Kogaku K.K. | 3.2 | 131 | 8 |
| c | 12 | | | | 12.4 | 133 | 8 |

Production examples of Toners d-f

| ingredients | parts by weight |
|---|---|
| styrene | 70 |
| n-butyl methacrylate | 30 |
| 2,2′-azobis(2,4-dimethylvaleronitrile) | 0.5 |
| carbon black MA#8 (made by Mitsubishi Kasei Kogyo K.K.) | 8 |
| Spilon Black TRH of chromium complex-type dye (made by Hodoya Kagaku Kogyo K.K.) | 5 |

The above ingredients were mixed sufficiently with the use of Sand-Stirrer to prepare a polymerizable composition. This polymerizable composition was mixed with an aqueous solution of arabic gum of a concentration of 3% by weight, and they were stirred at 4000 rpm with the use of T.K. AUTO HOMO MIxER (manufactured by Tokushukika Kogyo K.K.) to polymerize them at the temperature of 60° C. for 6 hours, and they were heated to 80 ° C. and further polymerized them. After their polymerization, the system of reaction was rinsed five times, then, filtered, dried, and air-classified resulting in spherical particles.

The bigger particles among the spherical particles obtained by the above air-classification were further classified to obtain Toner d of 16.4 μm in mean particle size, 118 in spheroidicity of toner, 13% in coefficient of variation of particle size distribution, 141° C. in softening point (Tm) and 61° C. in glass transition point (Tg).

The smaller particles among the spherical particles obtained by the above air-classification were further classified to obtain Toner e of 8.1 μm in mean particle size, 19% in coefficient of variation of particle size distribution.

The above obtained toners were further classified repeatedly to obtain Toner f of 8.4 μm in mean particle size, 117 in spheroidicity and 13% in coefficient of variation of particle size distribution.

Production examples of Toners g and h

| ingredients | parts by weight |
|---|---|
| styrene-n-butyl methacrylate (softening point of 132° C.; glass transition point of 60° C.) | 100 |
| carbon black (MA#8; made by Mitsubishi Kasei Kogyo K.K.) | 8 |
| Spilon Black TRH of chromium complex-type dye (made by Hodoya Kagaku Kogyo K.K.) | 3 |

The above-mentioned ingredients were sufficiently mixed by means of ball mills, thereafter being kneaded over a three-roller heated to 140° C. The kneaded mixture was left to stand for cooling it, and coarsely pulverized by means of feather mills. Then, the obtained particles were further pulverized into fine particles under jet stream, following by being air-classified to obtain Toner g of 8.5 μm in mean particle size, 162 in spheroidicity and 18% in coefficient of variation of particle size distribution.

The above obtained Toner g was further classified to obtain Toner h of 8.3 μm in mean particle size, 163 in spheroidicity, 12% in coefficient of variation of particle size distribution.

Production example of Toner i

Toner i was prepared in a similar manner to Production example of Toner a except that Nigrosine Base Ex (made by Orient Kagaku Kogyo K.K.) of 0.6 parts by weight was used as a charge controlling agent. Toner i was positive-chargeable and had 8.2 μm in mean particle size, 131 in spheroidicity and 8 in coefficient of variation.

Production examples of Carriers A-H $FeO_3$ was used as a main component of a carrier and mixed with CuO, NiO, ZnO, MuO, MgO so that the mixture might meet desired properties. The mixture was dispersed in an aqueous solution of polyvinyl alcohol to mix it by means of ball mills. Thus, a slurry of polyvinylalcohol aqueous solution containing materials for carriers was prepared. The slurry was sprayed and dried with a spray-drier to obtain spherical particles of 30-80 μm. The particles were sintered for about 10 hours at the temperature of 1000° C. under nitrogen atmosphere, followed by cooling them. On the other hand, styrene-acrylic resin of Hymer SBM 73 (made by Sanyo Kasei Kogyo K.K.) was dispersed and stirred uniformly in toluene with the help of high shearing stirring. Then, the above obtained ferrite particles were added to the dispersion, followed by being subjected to spray-drying with a spray-drier, and they were cooled. Then, the resultant ferrite particles were sifted through sieve openings so that particles with desired particle size might be obtained. Thus, Carriers A-H having solid state properties shown in table 2 were prepared.

TABLE 2

| Carrier sample | spheroidicity | particle size (μm) | magnetization in-magnetic field of 1000 e (gauss) | specific gravity |
|---|---|---|---|---|
| A | 132 | 75 | 3500 | 5.2 |
| B | 131 | 75 | 800 | 5.1 |
| C | 131 | 75 | 1200 | 5.2 |
| D | 131 | 75 | 2800 | 5.2 |
| E | 132 | 15 | 3500 | 5.2 |
| F | 131 | 25 | 3500 | 5.2 |
| G | 131 | 45 | 3500 | 5.2 |

TABLE 2-continued

| Carrier sample | spheroidicity | particle size (μm) | magnetization in-magnetic field of 1000 e (gauss) | specific gravity |
|---|---|---|---|---|
| H | 131 | 65 | 3500 | 5.2 |

Production example of Carrier J

Bigger particles among ferrite particles with the same composition as that of non-coated Carrier A in Production examples A–H were pulverized by use of Hybridization System NHS of Nara Kikai K.K. for 2 minutes at 6000 rpm to obtain ferrite particles. And then, obtained ferrite particles were coated with resin and classified in a manner similar to that of Production examples A–H to prepare Carrier J of 75 μm in particle size, 157 of spheroidicity, 3500 gauss in magnetization in the magnetic field of 1000 Oe, and 5.2 in specific gravity.

Production example of Carrier K

Carrier K was prepared in a similar manner to Production example of Carrier J except that ferrite particles with the same composition as that of non-coated Carrier D were used. Carrier D had 50 μm in mean particle size, 156 in spheroidicity, 2800 gauss in magnetization in the magnetic field of 1000 Oe and 5.2 in specific gravity.

Production examples of Carriers L and M

Iron particles (KG series; made by Kanto Denka K.K.) were used as core particles, and coated with resin and classified in a similar manner to Production example of Carrier A–I to prepare Carriers L and M having solid state properties shown in Table 3.

TABLE 3

| Carrier sample | spheroidicity | particle size (μm) | magnetization in-magnetic field of 1000 e (gauss) | specific gravity |
|---|---|---|---|---|
| L | 145 | 50 | 4500 | 6.7 |
| M | 146 | 75 | 4500 | 6.7 |

Production examples of Carriers N and O

| ingredients | parts by weight |
|---|---|
| polyester resin (softening point of 123° C.; glass transition point of 65° C., AV of 23, OHV of 40) | 100 |
| Ferrite fine particles of Fe—Zn series (MFP-2; made by TDK K.K.) | 500 |
| carbon black (AM#8; made by Mitsubishi Kasei) | 2 |

The above ingredients were mixed and ground sufficiently in a Henshel mixer, followed by being fused and kneaded with a extrusion kneader in which the cylinder part was set at 180° C. and the cylinder head part was set at 170° C. The kneaded mixture was left to stand for cooling, and coarsely pulverized by means of feather mills. Then, the obtained particles were further pulverized into fine particles under jet stream, followed by being classified under different classifying conditions by a classifier to obtain carriers N and O;
60 μm (Carrier N)
75 μm (Carrier O) in mean particle size;
165 in spheroidicity
2400 gauss in magnetization in the magnetic field of 1000 Oe
3.4 in specific gravity

Production example of Carrier P

| ingredients | parts by weight |
|---|---|
| styrene-n-butyl methacrylate (softening point of 132° C., glass transition point of 60°) | 100 |
| inorganic magnetic particles (EPT-1000; made by Toda Kogyo K.K.) | 500 |
| Carbon black (MA#8; made by Mitsubishi Kasei Kogyo K.K.) | 2 |

The above ingredients were used to prepare Carrier P in a similar manner to the Production example of Carrier N. Carrier P had 35 μm in mean particle size, 165 in spheroidicity, 2100 gauss in magnetization in the magnetic field of 1000 Oe and 2.5 in specific gravity.

Production example of Carrier Q

Carrier Q was prepared in a similar manner to the Production example N except that 100 parts by weight of ferrite fine particles of Fe-Zn series (MFP-2; made by TKD K.K.) were used and 400 parts by weight of non-magnetic ferrite of $CuFe_2O_4$-$CuMn_2O_4$ composition (made by Dainichi Seika Kogyo K.K.) were used. Carrier Q had 75 μm in mean particle size, 166 in spheroidicity, 800 gauss in magnetization in the magnetic field of 1000 Oe and 2.7 in specific gravity.

Production examples of Carriers R, S and T

Carriers N, O and Q were treated by means of Angmill in order to make them spherical. Carriers R, S and T having properties shown in Table 4 were obtained.

TABLE 4

| Carrier sample | spheroidicity | particle size (μm) | magnetization in magnetic field of 1000 e (gauss) | specific gravity | comment |
|---|---|---|---|---|---|
| R | 137 | 60 | 2400 | 3.4 | made spherical |
| S | 136 | 75 | 2400 | 3.4 | made spherical |
| T | 136 | 75 | 800 | 2.7 | made spherical |

The resultant toners and carriers were summarized in Table 5 and Table 6 below.

TABLE 5

| Toner sample | spheroidicity | particle size (μm) | coefficient of evaluation (%) | production method |
|---|---|---|---|---|
| a | 132 | 8.3 | 8 | |
| b | 131 | 3.2 | 8 | |
| c | 133 | 12.4 | 8 | |
| d | 118 | 16.4 | 13 | * |
| e | 118 | 8.1 | 19 | * |
| f | 117 | 8.4 | 13 | * |
| g | 162 | 8.5 | 18 | ** |
| h | 163 | 8.3 | 12 | ** |
| i | 131 | 8.2 | 8 | |

*suspension polymerized toner
**pulverizing method

TABLE 6

| carrier sample | spheroidicity | particle size (μm) | magnetization in magnetic field of 1000 Oe (gauss) | specific gravity | comment |
|---|---|---|---|---|---|
| A | 132 | 75 | 3500 | 5.2 | coated ferrite |
| B | 131 | 75 | 800 | 5.1 | coated ferrite |
| C | 131 | 75 | 1200 | 5.2 | coated ferrite |
| D | 131 | 75 | 2800 | 5.2 | coated ferrite |
| E | 132 | 15 | 3500 | 5.2 | coated ferrite |
| F | 131 | 25 | 3500 | 5.2 | coated ferrite |
| G | 131 | 45 | 3500 | 5.2 | coated ferrite |
| H | 131 | 65 | 3500 | 5.2 | coated ferrite |
| J | 157 | 75 | 3500 | 5.2 | coated ferrite (pulverized) |
| K | 156 | 50 | 2800 | 5.2 | coated ferrite (pulverized) |
| L | 145 | 50 | 4500 | 6.7 | coated granular iron particle |
| M | 146 | 75 | 4500 | 6.7 | coated granular iron particle |
| N | 165 | 60 | 2400 | 3.4 | binder type |
| O | 165 | 75 | 2400 | 3.4 | binder type |
| P | 165 | 35 | 2100 | 2.5 | binder type |
| Q | 166 | 75 | 800 | 2.7 | coated ferrite |
| R | 137 | 60 | 2400 | 3.4 | binder type (made spherical) |
| S | 136 | 75 | 2400 | 3.4 | binder type (made spherical) |
| T | 136 | 75 | 800 | 2.7 | binder type (made spherical) |

Evaluation for Properties

One hundred parts by weight of each of the abovementioned Toners a–i were subjected to surface treatment with 0.1 part by weight of Colloidal Silica R-972 (produced by Nippon Aerogile K.K.). The treated toners were used for evaluation of various properties.

Two grams of the respective surface-treated toners, and 28 grams of the specified carrier shown in Table 7 were put in a poly bottle of a capacity of 50 cc, and were stirred respectively for 3 minutes, 10 minutes, and 30 minutes. Then, the resultant charge amount and scattering amount were measured so as to examine the electrification-build-up properties of the Toners after the poly bottle was rotated on a rotating carriage at 1200 rpm.

The scattering amount was measured with the use of a digital dust measuring apparatus of P5H2 type (manufactured by Shibata Kagaku K.K.). The dust measuring apparatus was spaced 10 cm apart from a magnet roll, and two grams of the developer were set on the magnet roll, which was rotated at 2,000 rpm. Then, the dust measuring apparatus detected the toner particles scattering about as dust, and displayed the resultant value in the number of counts per minute, i.e. cpm. The measured results of charge amount and scattering amount were shown in Table 7.

TABLE 7

| | toner | carrier | 3 min. charging amount (μC/g) | 3 min. scattering amount (cpm) | 10 min. charging amount (μC/g) | 10 min. flying amount (cpm) | 30 min. charging amount (μC/g) | 30 min. flying amount (cpm) | toner fogs | image density I.D. | image quality |
|---|---|---|---|---|---|---|---|---|---|---|---|
| Comparative Example | | | | | | | | | | | |
| 1 | a | A | −5 | 1368 | −8 | 1277 | −10 | 1239 | x | x | x |
| 2 | a | B | −5 | 881 | −8 | 836 | −10 | 821 | x | x | x |
| 3 | a | E | −7 | 797 | −11 | 632 | −13 | 588 | Δ | Δ | x |
| Example | | | | | | | | | | | |
| 1 | a | F | −10 | 253 | −12 | 241 | −13 | 235 | o | o | Δ |
| 2 | a | G | −10 | 267 | −13 | 255 | −13 | 252 | Δ | o | Δ |
| 3 | a | H | −9 | 271 | −11 | 267 | −12 | 259 | Δ | o | Δ |
| 4 | a | J | −10 | 363 | −12 | 337 | −13 | 311 | Δ | o | Δ |
| 5 | a | K | −13 | 110 | −13 | 103 | −13 | 98 | oo | oo | o |
| 6 | a | L | −13 | 108 | −13 | 100 | −14 | 96 | o | oo | o |
| 7 | a | M | −10 | 345 | −11 | 333 | −11 | 317 | Δ | o | Δ |
| 8 | a | N | −14 | 87 | −14 | 83 | −14 | 81 | oo | oo | oo |
| 9 | a | O | −10 | 189 | −12 | 173 | −12 | 165 | o | o | o |
| 10 | a | P | −13 | 91 | −14 | 90 | −14 | 88 | oo | oo | oo |
| 11 | a | Q | −10 | 357 | −12 | 341 | −13 | 332 | o | o | Δ |
| 12 | a | R | −10 | 251 | −12 | 243 | −13 | 237 | Δ | o | o |
| 13 | b | N | −16 | 101 | −17 | 96 | −17 | 91 | oo | oo | oo |
| 14 | c | N | −13 | 96 | −13 | 91 | −14 | 88 | oo | oo | oo |
| Comparative Example | | | | | | | | | | | |
| 4 | d | N | −9 | 283 | −10 | 278 | −10 | 277 | o | o | x |
| 5 | e | N | −8 | 301 | −11 | 236 | −13 | 207 | o | oo | Δ |
| Example | | | | | | | | | | | |
| 15 | f | N | −11 | 263 | −11 | 231 | −12 | 219 | oo | oo | oo |
| Comparative Example | | | | | | | | | | | |
| 6 | g | N | −11 | 198 | −13 | 187 | −15 | 172 | o | Δ | x |
| 7 | h | N | −12 | 194 | −14 | 183 | −16 | 168 | o | Δ | x |
| 8 | i | A | +4 | 1463 | +7 | 1251 | +8 | 1118 | x | x | x |
| 9 | i | E | +6 | 870 | +9 | 694 | +13 | 429 | Δ | Δ | x |
| Example | | | | | | | | | | | |

TABLE 7-continued

| | | | 3 min. | | 10 min. | | 30 min. | | | image | |
|---|---|---|---|---|---|---|---|---|---|---|---|
| | toner | carrier | charging amount (µC/g) | scattering amount (cpm) | charging amount (µC/g) | flying amount (cpm) | charging amount (µC/g) | flying amount (cpm) | toner fogs | density I.D. | image quality |
| 16 | i | N | +14 | 93 | +14 | 89 | +14 | 84 | oo | oo | oo |

It is understood from Table 7 that the combination of toners having 150 or less in spheroidicity, 14 µm or less in mean particle size and 15% or less in coefficient of variation with carriers having 20–70 µm in mean particle size or 140 or more in spheroidicity effected good and stable electrification-build-up of toners, low scattering amounts and practically good image quality such as toner fogs and image density as copied-image evaluations. Best results were obtained with the use of carriers having both 20–70 µm in mean particle size and 140 or more in spheroidicity.

Even though toners are positive-chargeable or negative chargeable, preferred toners are 14 µm or less in mean particle size in order to get good image qualities. The small toners of 14 µm or less in mean particle size need to have both spheroidicity of 150 or less and coefficient of variation of 15% or less so that solid state properties of particles, for example, fluidity, which are necessary to utilize the small toners as a toner itself or a component of a developer may be achieved, resulting in good chargeability, scattering properties etc.

Evaluations on image formation properties

Toners and carriers specified in Table 7–Table 9 were mixed at the mixing ratio of toners to carriers (toner/carrier) of 7/93 to prepare developers of two components system. The obtained developers were subjected to various kinds of evaluations on image formation properties of initial stage. Negative chargeable toners were evaluated with EP-570Z (manufactured by Minolta Camera K.K.) and positive chargeable toners were evaluated with EP-470Z (manufactured by Minolta Camera K.K.)

The results were shown in Table 7–Table 9.

(1) Evaluation on mixing and stirring properties of toner/carrier

A developer above mentioned was stirred for 3 minutes in the developing machine of EP-570 or EP-470Z. The developing machine was only driven under practical conditions of EP-570 or EP-470Z. Then, a part of the developer was taken out from the developing machine to measure the mixing ratio of toner/carrier for evaluations on mixing uniformity. The mixing and stirring properties were ranked to show the symbols (oo, o, Δ, x). A developer needs the higher rank than Δ for practical use, preferably the higher rank than o.

(2) Evaluation on spent carriers

The same developer as used in (1) above was charged for 5 hours in the developing machine in a similar manner to (1). Then, the resultant developer was put into water for dispersion to separate carriers from toners. The separated carriers were taken out to dry them. The dried carriers were put into ethanol solvent for dispersion to dissolve charge controlling agents which adhered onto the surfaces of carriers transferred from toners. The amounts of charge controlling agents were measured by a spectrophotometer. The evaluations were ranked by the four symbols ( oo, o, Δ, and x) according to the degree of measured amount. A developer needs the higher rank than Δ for practical use, preferably the higher rank than o.

(3) Fogs on copied images

Copied images were formed in the foregoing combination of toners with carriers with EP-570Z or EP-470Z. Toner fogs around copied images on white paper were observed for the evaluation of fogs on copied images. The evaluations were ranked by the four symbols ( oo, o, Δ, and x). The higher rank than Δ, preferably the higher rank than o are needed for practical use.

(4) Carrier development, Image-density, Carrier-lines, Image-quality

The standard chart of Dataquest company was copied under adequate exposure under the same condition aforementioned.

The amounts of developed carriers were evaluated by the carrier amount existing on white parts of copying paper. The Image-Density was estimated on the density of solid parts with the use of Sakura reflection density measuring apparatus. The carrier lines were evaluated on the generating states of carrier lines in half-density parts of copied images. The image quality was totally evaluated on gradient, resolution power, line reproducibility, image-texture. The foregoing evaluations were ranked by the four symbols ( oo, o, Δ, and x). The higher rank than Δ, preferably the higher rank than o, needed for practical use.

(5) Durability with respect to copy

The same developer as used in the example 8 was subjected to the durability with respect to repeating copy of 100,000 times. The charge amounts were stable and good properties at the initial stage of copy shown in Table 7 were always kept.

(6) Developer aggregation

The same developer as used in the evaluation of spent carriers was charged for 5 hours in the developing machine in a similar manner to (1). When the resultant developer was sifted through sieve openings of 125 µm. The easiness of passing was observed for the evaluation of developer carrier aggregation to be ranked by the four symbols ( oo, o, Δ, x). The higher rank than Δ, preferably the higher rank than o, are needed for practical use.

The results were shown in Tables 7–9.

TABLE 8

| | developer | | carrier | carrier |
|---|---|---|---|---|
| | toner | carrier | development | line |
| Example 8 | a | N | o | o |
| Example 9 | a | O | o | o |
| Example 10 | a | P | o | o |
| Example 12 | a | R | o | o |
| Comparative Example 1 | a | A | o | X |
| Comparative Example 2 | a | B | X | o |
| Example 17 | a | C | o | o |
| Example 18 | a | D | o | o |
| Comparative Example 3 | a | E | X | X |
| Example 19 | a | S | o | o |

TABLE 9

| | developer | | stirring and mixing properties of toner/carrier | aggregation properties of developer | spent carrier |
|---|---|---|---|---|---|
| | toner | carrier | | | |
| Comparative Example 1 | a | A | X | X | X |
| Comparative Example 2 | a | B | X | X | X |
| Comparative Example 3 | a | E | X | Δ | Δ |
| Example 8 | a | N | ∞ | ∞ | ∞ |
| Example 9 | a | O | o | Δ | o |
| Example 10 | a | P | ∞ | ∞ | ∞ |
| Example 12 | a | R | o | ∞ | ∞ |
| Example 19 | a | S | Δ | o | Δ |
| Example 20 | a | T | o | o | o |

It was understood from Table 8 that when carriers were magnetized to the lower level than 900 gauss in the magnetic field of 1000 Oe, they were developed resulting in the deterioration of image quality. It was also understood that when carriers were magnetized to higher level than 3000 gauss in the magnetic field of 1000 Oe, the hard ear of magnetic brush and the generation of carrier lines in the parts of solids caused the deterioration of image quality.

It was understood from Table 9 that when the true specific gravity of carriers was 5 or less, the mixing and stirring properties of toners and carriers were improved, the excessive stress was not given to toners at mixing and stirring, carriers did not become spent, the chargeability was stabilized for a long time and toners themselves or a developer (toners and carriers) did not aggregate together.

What is claimed is:

1. A two-component developer containing toner particles and carrier particles wherein the toner particles have spheroidicity of 150 or less, mean particle size of 14 μm or less and coefficient of variation of 15% or less, and the carrier particles have at least one of mean particle size of between 20 μm and 70 μm and spheroidicity of 140 or more, said coefficient of variation defined as:

coefficient of variation $(\%) = (\sigma/x) \times 100$ wherein a standard deviation value $(\sigma)$ is represented by the following formula:

$$\sigma = \sqrt{\frac{(x_1 - x)^2 + (x_2 - x)^2 + \ldots (x_n - x)^2}{n - 1}}$$

$$= \sqrt{\frac{1}{n-1}\left[\Sigma x_i^2 - \frac{(\Sigma x_i)^2}{n}\right]}$$

wherein $X_1, X_2 \text{---}, X_n$ represent respective particle sizes of sample particles, X represents the mean value of the n particle sizes.

2. A developer of claim 1, wherein the toner comprises a core particle comprising thermoplastic resin, a colorant-containing layer formed on the surface of the core particle and a coating layer comprising fine particles of thermoplastic resin on the colorant-containing layer.

3. A developer of claim 2, wherein the coating layer is formed by fusing the fine particles adhered electrostatically on the colorant-layer by means of mechanical shearing force.

4. A developer of claim 2, wherein the coating layer comprises fine particles and charge controlling agents.

5. A developer of claim 2, the core particles are spherical polymer particles of monodispersion prepared by seed polymerization.

6. A developer of claim 1, wherein the carriers are magnetized to the level of between 900 and 3000 gauss in the magnetic field of 1000 Oe.

7. A developer of claim 1, wherein the carriers have 5 or less in true specific gravity 8. A developer of claim 1, wherein the carrier particles have said mean particle size or said spheroidicity and have 5 or less in true specific gravity and are magnetized to the level of between 900 and 3000 gauss in the magnetic field of 1000 Oe.

9. A two-component developer containing toner particles and carrier particles wherein the toner particles have spheroidicity of 150 or less, mean particle size of 14 μm or less and coefficient of variation of 15% or less, and the carrier particles have mean particle size of between 20 μm and 70 μm, spheroidicity of 140 or more, true specific gravity of 5 or less and are magnetized to the level of between 900 and 3000 gauss in the magnetic field of 1000 Oe, said coefficient of variation being defined as:

coefficient of variation $(\%) = (\sigma/x) \times 100$ wherein a standard deviation value $(\sigma)$ is represented by the following formula:

$$\sigma = \sqrt{\frac{(x_1 - x)^2 + (x_2 - x)^2 + \ldots (x_n - x)^2}{n - 1}}$$

$$= \sqrt{\frac{1}{n-1}\left[\Sigma x_i^2 - \frac{(\Sigma x_i)^2}{n}\right]}$$

wherein $X_1, X_2 \text{---}, X_n$ represent respective particle sizes of sample particles, X represents the mean value of the n particle sizes.

10. A developer of claim 9, wherein the toner comprises a core particle comprising thermoplastic resin, a colorant-containing layer formed on the surface of the core particle and a coating layer comprising fine particles of thermoplastic resin on the colorant-containing layer.

11. A developer of claim 10, wherein the coating layer is formed by fusing the fine particles adhered electrostatically on the colorant-layer by means of mechanical shearing force 12. A developer of claim 10, wherein the coating layer comprises fine particles and charge controlling agents.

13. A developer of claim 10, the core particles are spherical polymer particles of monodispersion prepared by seed polymerization.

14. A developer of claim 10, wherein the carrier comprises binder resin and fine magnetic powder dispersed in binder resin.

15. A developer of claim 1, wherein the toner particles have coefficient of variation of 10% or less.

16. A developer of claim 9, wherein the toner particles have coefficient of variation of 10% or less.

17. A two-component developer containing toner particles and carrier particles wherein the toner particles have spheroidicity of 150 or less, mean particle size of 14 μm or less and coefficient of variation of 15% or less, and the carrier particles have at least one of (1) true specific gravity of 5 or less and (2) a magnetization level of between 900 and 3000 gauss in the magnetic field of 1000 Oe, said coefficient of variation being defined as:

coefficient of variation $(\%)=(\sigma/x)\times 100$ wherein a standard deviation value ($\sigma$) is represented by the following formula:

$$\sigma = \sqrt{\frac{(x_1-x)^2+(x_2-x)^2+\ldots(x_n-x)^2}{n-1}}$$

$$= \sqrt{\frac{1}{n-1}\left[\Sigma x_i^2 - \frac{(\Sigma x_i)^2}{n}\right]}$$

wherein $X_1, X_2$---, $X_n$ represent respective particle sizes of sample particles, X represents the mean value of the n particle sizes.

18. A developer of claim 17, wherein the toner particles have coefficient of variation of 10% or less.

19. A two-component developer containing toner particles and carrier particles wherein the toner particles have spheroidicity of 150 or less, mean particle size of 14 μm or less and coefficient of variation of 15% or less, and the carrier particles comprise binder resin and fine magnetic powder dispersed in binder resin, said carrier particles having mean particle size of between 20 μm and 70μm, and said coefficient of variation being defined as:

coefficient of variation $(\%)=(\sigma/x)\times 100$ wherein a standard deviation value ($\sigma$) is represented by the following formula:

$$\sigma = \sqrt{\frac{(x_1-x)^2+(x_2-x)^2+\ldots(x_n-x)^2}{n-1}}$$

$$= \sqrt{\frac{1}{n-1}\left[\Sigma x_i^2 - \frac{(\Sigma x_i)^2}{n}\right]}$$

wherein $X_1, X_2$---, $X_n$ represent respective particle sizes of sample particles, X represents the mean value of the n particle sizes.

* * * * *